United States Patent [19]
Niiyama

[11] Patent Number: 5,538,479
[45] Date of Patent: Jul. 23, 1996

[54] CONTROL APPARATUS FOR HYDRAULICALLY OPERATED TRANSMISSION

[75] Inventor: Tsunefumi Niiyama, Saitama, Japan

[73] Assignee: Honda Giken Kogyo Kabushiki Kaisha, Tokyo, Japan

[21] Appl. No.: 452,507

[22] Filed: May 30, 1995

[30] Foreign Application Priority Data

Jul. 29, 1994 [JP] Japan ..................... 6-177947

[51] Int. Cl.$^6$ ........................................ F16H 5/06
[52] U.S. Cl. ........................................ 475/128
[58] Field of Search ................... 475/116, 127, 475/128

[56] References Cited

U.S. PATENT DOCUMENTS 5,109,734  5/1992  Fujiwara .................... 475/127
5,305,665  4/1994  Sano et al. ................ 475/128

FOREIGN PATENT DOCUMENTS 23727   1/1990  Japan.
460271  2/1992  Japan.

Primary Examiner—Dirk Wright
Attorney, Agent, or Firm—Lyon & Lyon

[57] ABSTRACT

A changeover valve is provided on an upstream side of solenoid valves for hydraulic engaging elements. The changeover valve is urged to the closed position by the hydraulic oil pressure of a plurality of hydraulic engaging elements which are concerned with the speed changing. At the time of failure in which three or more of the hydraulic engaging elements are simultaneously engaged, the changeover valve is changed over to the closed position to thereby lower the hydraulic oil pressure in the hydraulic engaging elements on the downstream side of the changeover valve, whereby the simultaneous engagement is prevented. In the closed position, a hydraulic oil pressure of a predetermined pressure is inputted to the changeover valve via an oil passage. The chattering of the changeover valve is thus prevented even if the hydraulic oil pressure in the hydraulic engaging elements may be lowered.

5 Claims, 2 Drawing Sheets

CONTROL APPARATUS FOR HYDRAULICALLY OPERATED TRANSMISSION

BACKGROUND OF THE INVENTION

1. Field of the Invention

The present invention relates to a control apparatus for a hydraulically operated transmission mainly used as a hydraulically operated vehicular transmission.

2. Description of Related Art

As hydraulically operated transmissions, there are conventionally known a parallel-2-shaft type of transmission which is made up of parallely disposed input and output shafts and a plurality of gear trains having interposed a hydraulic clutch in each of them, and a planetary gear type of transmission which is made up of a combination of a planetary gear mechanism, hydraulic clutches and hydraulic brakes. They are both arranged to perform speed changing among a plurality of transmission trains by using the hydraulic engaging elements which are made up of hydraulic clutches, hydraulic brakes, or the like.

Conventionally, as a control apparatus for this kind of hydraulically operated transmission, there is known one in which a plurality of solenoid valves corresponding in number to the plurality of hydraulic engaging elements are provided so that the hydraulic oil supply to, and discharge from, each of the hydraulic engaging elements can be controlled. In this control apparatus, there is the following problem. Namely, when the solenoid valves are poorly operated or wrongly operated, hydraulic engaging elements other than that for establishing a desired transmission train are also engaged, with the result that there occurs a so-called simultaneous engagement in which a plurality of transmission trains are simultaneously established.

In order to solve this kind of problem, there is known an apparatus in Japanese Published Unexamined Patent Application No. 3727/1990. In this apparatus, between a solenoid valve and a hydraulic engaging element, there is provided a changeover valve which can be changed over between an open position in which the solenoid valve and the hydraulic engaging element are connected together and a closed position in which this connection is shut off. Upon this changeover valve there are operated a hydraulic oil pressure from another hydraulic engaging element and a hydraulic oil pressure from the solenoid valve as a hydraulic oil pressure to urge the changeover valve to the closed position. It is thus so arranged that the changeover valve is changed over to the closed position if the oil pressure from the solenoid valve rises due to a wrong operation at the time of establishing another transmission train, whereby the engagement of the hydraulic engaging element on the downstream side of the solenoid valve is blocked.

Further, from the Japanese Published Unexamined Patent Application No. 60271/1992, there is known the following apparatus. Namely, in this apparatus a changeover valve is interposed between a solenoid valve for controlling the hydraulic oil supply to, and discharge from, a hydraulic engaging element and an oil supply passage on an upstream side of the solenoid valve. To this changeover valve there is inputted, as a hydraulic oil pressure for urging the changeover valve towards a closed position, a hydraulic oil pressure of another hydraulic engaging element. At the time of engagement of said another hydraulic engaging element, the changeover valve is changed over to the closed position to thereby stop the oil supply to the solenoid valve. The engagement of the hydraulic engaging element on the downstream side of the solenoid valve is thus blocked.

In the apparatus like the above-described former conventional example in which the changeover valve is provided on the downstream side of the solenoid valve, the length of the oil passage between the solenoid valve and the hydraulic engaging element becomes long, resulting in a larger flow resistance in the oil passage. It follows that there will occur a delay in the hydraulic oil supply to, and discharge from, the hydraulic engaging element by the closing and opening of the solenoid valve, resulting in a poor response in the speed changing.

On the other hand, if the changeover valve is provided on the upstream side of the solenoid valve as in the above-described letter conventional example, the length of the oil passage between the solenoid valve and the hydraulic engaging element can be shortened. However, when the speed changing is performed by releasing the engagement of said another hydraulic engaging element and also by engaging the hydraulic engaging element on the downstream side of the solenoid valve, the changeover valve is held in the closed position until the hydraulic oil pressure in said another hydraulic engaging element is lowered below a predetermined value. Therefore, the hydraulic oil cannot be supplied to the hydraulic engaging element on the downstream side of the solenoid valve and, consequently, the starting of the oil supply is delayed. This results in a poor response in the speed changing like in the above-described former conventional example.

In this case, the following may be considered. Namely, to the changeover valve there is also inputted the hydraulic oil pressure of the hydraulic engaging element on the downstream side of the solenoid valve as the hydraulic oil pressure for urging the changeover valve towards the closed position. The changeover valve is then changed over to the closed position at the time of a failure when the hydraulic oil pressure on the downstream side of the solenoid valve rises by a wrong operation at the time of engaging said another hydraulic engaging element. At the time of speed changing, the oil supply to the hydraulic engaging element on the downstream side of the solenoid valve is then arranged to be started from the beginning. In this arrangement, however, the changeover valve may once be changed over to the closed position at the time of a failure, but the hydraulic oil pressure in the hydraulic engaging element on the downstream side of the solenoid valve is lowered by this changing over. Consequently, the solenoid valve is opened again and the chattering of the changeover valve may occur.

In view of the above-described points, the present invention has an object of providing a control apparatus which can positively block the simultaneous engagement without impairing the response in the speed changing.

SUMMARY OF THE INVENTION

In order to attain the above and other objects, the first aspect of the present invention is a control apparatus for a hydraulically operated transmission having a plurality of hydraulic engaging elements, comprising: a solenoid valve for controlling hydraulic oil supply to, and discharge from, a predetermined hydraulic engaging element; a changeover valve which is interposed between the solenoid valve and an oil supply passage on an upstream side of the changeover valve and which can be changed over between an open position for establishing a connection between the oil passage and the solenoid valve and a closed position for shutting off the connection; wherein, at the time of engagement of another hydraulic engaging element which should not be engaged simultaneously with the predetermined hydraulic engaging element, engagement of the predetermined hydraulic engaging element is blocked by changing over of the changeover valve to the closed position; wherein the changeover valve is inputted, as a hydraulic oil pressure to urge it towards the closed position, by a hydraulic oil pressure of the predetermined hydraulic engaging element and a hydraulic oil pressure of said another hydraulic engaging element such that, when the hydraulic oil pressure of one of said both hydraulic engaging elements has risen at the time of engagement of the other of said both hydraulic engaging elements, the changeover valve can be changed over to the closed position; and hydraulic oil pressure input means for inputting, as a hydraulic oil pressure to urge the changeover valve to the closed position, a working hydraulic oil pressure of a predetermined pressure in interlocking with changing over of the changeover valve to the closed position. The working hydraulic oil pressure is free from an influence of the solenoid valve.

According to a second aspect, the present invention is an apparatus for controlling a hydraulically operated transmission having a plurality of three or more hydraulic engaging elements, the transmission having a plurality of transmission trains to be established by a simultaneous engagement of respective two of the hydraulic engaging elements. The apparatus comprises: a solenoid valve for controlling hydraulic oil supply to, and discharge from, a predetermined hydraulic engaging element; a changeover valve which is interposed between the solenoid valve and an oil supply passage on an upstream side of the solenoid valve and which can be changed over between an open position for establishing a connection between the oil passage and the solenoid valve and a closed position for shutting off the connection; wherein the changeover valve is inputted, as a hydraulic oil pressure to urge it towards the closed position, by a hydraulic oil pressure of a plurality of hydraulic engaging elements inclusive of the predetermined hydraulic engaging element such that when, at the time of engagement of any two of the hydraulic engaging elements, the hydraulic oil pressure of one or more of the remaining hydraulic engaging elements has risen, the changeover valve is changed over to the closed position; and hydraulic oil pressure input means for inputting, as a hydraulic oil pressure to urge the changeover valve to the closed position, a working hydraulic oil pressure of a predetermined pressure in interlocking with changing over of the changeover valve to the closed position. The working hydraulic oil pressure is free from an influence of the changeover valve.

At the time of a failure when two hydraulic engaging elements which should not be simultaneously engaged are simultaneously engaged (as in the case of the first aspect of the present invention), or at the time of a failure when three hydraulic engaging elements are simultaneously engaged (as in the case of the second aspect of the present invention), the changeover valve is changed over to the closed position to thereby stop the hydraulic oil supply to the solenoid valve. Then, even if the hydraulic oil pressure in the predetermined hydraulic engaging element on the downstream side of the solenoid valve is lowered by the changing over to the closed position, the working oil pressure of a predetermined pressure is inputted into the changeover valve by means of the hydraulic oil pressure input means. Therefore, the changeover valve is maintained in the closed position until the hydraulic oil pressure in the hydraulic engaging element other than the predetermined hydraulic engaging element lowers. The chattering of the changeover valve can thus be prevented, and the occurrence of a simultaneous engagement can surely be blocked.

Further, since the changeover valve is held in the open position at the time of non-failure, the hydraulic oil can be supplied, at the time of speed changing, to the predetermined hydraulic engaging element from the beginning via the solenoid valve. Furthermore, since the changeover valve is disposed on the upstream side of the solenoid valve, the length of the oil passage between the solenoid valve and the predetermined hydraulic engaging element on the downstream side of solenoid valve can be made shorter, whereby the speed changing can be made with a good response.

By the way, the above-described hydraulic oil pressure input means may also be made up by interposing a gate valve (or shutoff valve) which opens in interlocking with the changing over of the changeover valve to the closed position, in an input oil passage of the working oil pressure in communication with that oil chamber of the changeover valve which urges the changeover valve towards the closed position. However, if there is integrally formed in the changeover valve a valve portion which is interposed in the input oil passage so as to open the input oil passage at the closed position of the changeover valve, there is an advantage in that a separate valve for the hydraulic oil input means becomes needless, resulting in a simpler construction.

Further, if there is provided an exclusive oil chamber for inputting the working oil pressure to the changeover valve, the changeover valve becomes large in size and the response of the changeover valve at the time of failure becomes poor. In such a case, if an oil passage which is in communication with the predetermined hydraulic engaging element and the input oil passage of the working hydraulic oil pressure are connected, via a shuttle valve, to an oil chamber in the changeover valve to input therein the hydraulic oil pressure of the predetermined hydraulic engaging element, the oil chamber can be used also as an input oil chamber for the working hydraulic oil pressure. It is therefore advantageous in that the changeover valve needs not be made large in size.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
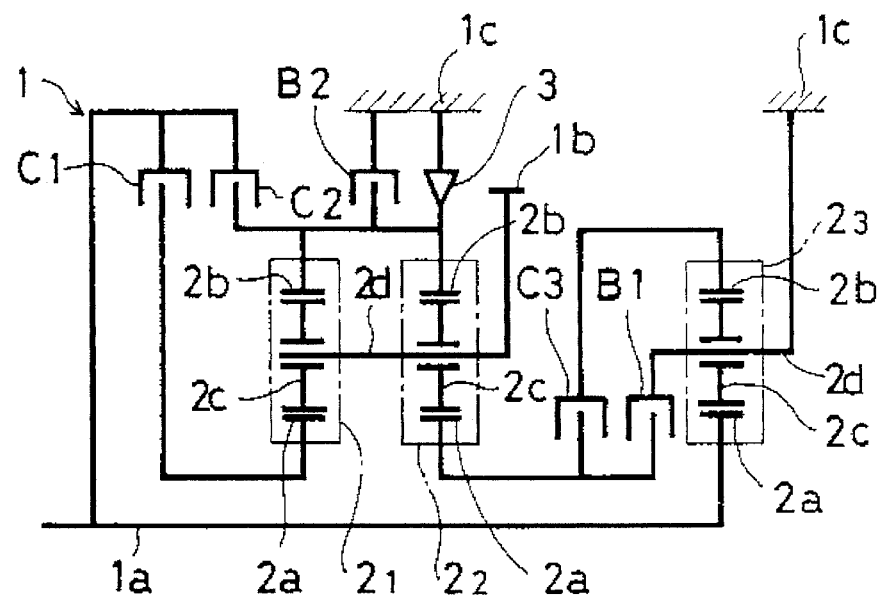
FIG. 1 is a schematic diagram of one example of a transmission to which the apparatus of the present invention is applied.

With reference to FIG. 1, numeral 1 denotes a transmission. This transmission 1 is constituted by, or made up of, a planetary type transmission which has first through third, i.e., a total of three planetary gears $2_1$, $2_2$, $2_3$, which are provided coaxially with an input shaft $1a$, for effecting the changing of a vehicle speed to five forward speeds and one reverse speed.

Each of the planetary gears $2_1, 2_2, 2_3$ is made up of a sun gear $2a$, a ring gear $2b$, a pinion $2c$ which engages with both the gears $2a, 2b$, and a carrier $2d$ which rotatably supports the pinion $2c$. The ring gear $2b$ and the carrier $2d$ of the first planetary gear $2_1$ and the ring gear $2b$ and the carrier $2d$ of the second planetary gear $2_2$ are respectively connected to each other. An output gear $1b$ of the transmission 1 is connected to the carriers $2d$ of both the first and the second planetary gears $2_1, 2_3$. The ring gears $2b$ of both the planetary gears $2_1, 2_2$ are connected to a casing $1c$ of the transmission 1 via a one way clutch 3 which serves as a member for receiving the reaction force. Further, the sun gear $2a$ of the third planetary gear $2_3$ is connected to the input shaft $1a$. The carrier $2d$ of the third planetary gear $2_3$ is connected to the casing $1c$ to prevent the rotation thereof.

In the transmission 1 there are provided the following as hydraulic engaging elements: i.e., a first clutch C1 for connecting the input shaft $1a$ to the sun gear $2a$ of the first planetary gear $2_1$; a second clutch C2 for connecting the input shaft $1a$ to the ring gears $2b$ of both the first and the second planetary gears $2_1, 2_2$; a third clutch C3 for connecting the ring gear $2b$ of the third planetary gears $2_3$ to the sun gear $2a$ of the second planetary gear $2_2$; a first brake B1 for connecting the sun gear $2a$ of the second planetary gear $2_2$ to the carrier $2d$ of the third planetary gear $2_3$; and a second brake B2 for connecting the ring gears $2b$ of both the first and the second planetary gears $2_1, 2_2$ to the casing $1c$.

According to the above-described constitution or construction, it is so arranged that the following are attained: namely, the first-speed transmission train is established when the first clutch C1 is engaged; the second-speed transmission train is established when both the first clutch C1 and the first brake B1 are engaged; the third-speed transmission train is established when both the first clutch C1 and the third clutch C3 are engaged; the fourth-speed transmission train is established when both the first clutch C1 and the second clutch C2 are engaged; the fifth-speed transmission train is established when both the second clutch C2 and the third clutch C3 are engaged; a reverse transmission train is established when both the third clutch C3 and the second brake B2 are engaged; and the first-speed transmission train is established in a condition in which engine brake can work when both the first clutch C1 and the second brake B2 are engaged.

Figure 2:
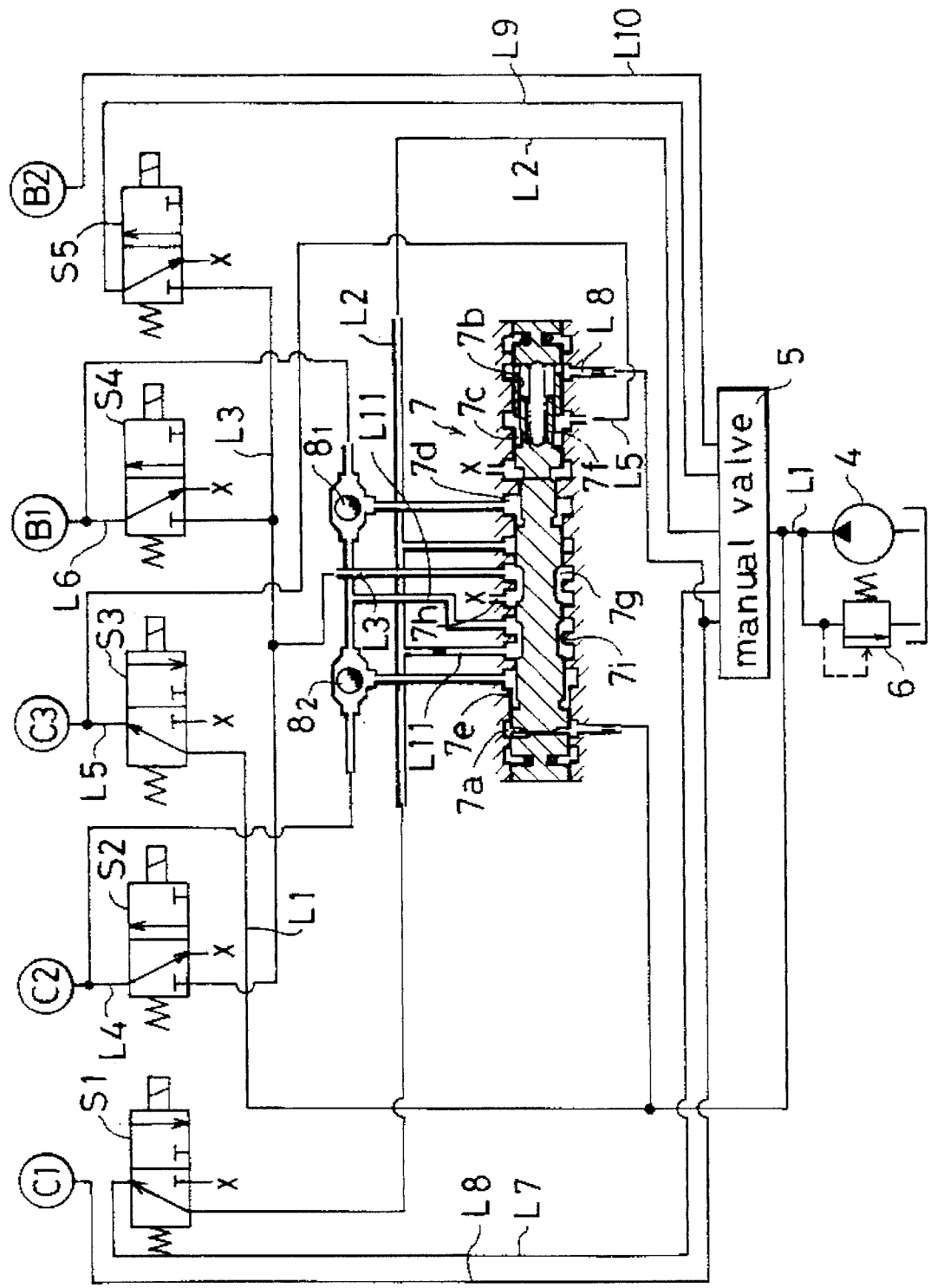
FIG. 2 is a hydraulic circuit diagram of one example of the apparatus of the present invention.

The operation of these clutches C1, C2, C3 and the brakes B1, B2 is controlled by the hydraulic control circuit as shown in FIG. 2. In this hydraulic control circuit, there are provided a hydraulic oil pressure source 4, a manual valve 5, and first through fifth, i.e., a total of five solenoid valves S1–S5 for separately controlling the supply and discharge of the hydraulic oil to and from each of the clutches C1, C2, C3 and each of the brakes B1, B2.

The manual valve 5 is arranged to be changed over, in interlocking with the operation of a selector lever (not shown), among R position for reverse running, N and P positions for neutral and parking conditions, D position for automatic speed changing, and L position for holding the first speed. In the D position and the L position, an oil passage L1 which is communicated with the hydraulic oil pressure source 4 is connected to an oil passage L2 so as to supply pressurized hydraulic oil to the oil passage L2, the pressure of the predetermined hydraulic oil being adjusted by a regulator valve 6 to a predetermined line pressure. The hydraulic oil is thus constantly supplied to the first solenoid valve S1 for the first clutch C1 via the oil passage L2, and is also supplied, via an oil passage L3 which is branched from the oil passage L2, to the second solenoid valve S2 for the second clutch C2, to the fourth solenoid valve S4 for the first brake B1, and to the fifth solenoid valve S5 for the second brake B2. To the third solenoid valve S3 for the third clutch C3 there is constantly supplied the hydraulic oil via the oil passage L1 irrespective of the manual valve 5.

The second through the forth solenoid valves S2, S3, S4 are directly connected to the second clutch C2, the third clutch C3 and the first brake B1 respectively via oil passages L4, L5, L6 on the downstream side thereof. To an oil passage L7 on the downstream side of the first solenoid valve S1, on the other hand, there is connected an oil passage L8 which becomes communicated with the first clutch C1 via the manual valve 5 when it is in the D position. Further, to an oil passage L9 on the downstream side of the fifth solenoid valve S5 there is connected an oil passage L10 which becomes communicated with the second brake B2 via the manual valve 5 when it is in the L position. The oil passage L8 is connected to the oil passage L1 in the L position of the manual valve 5, and the oil passage L10 is connected to the oil passage L1 in the R position of the manual valve 5. Therefore, in the L position of the manual valve 5 the first clutch C1 is constantly engaged, so that the first-speed transmission train is established in a condition in which the engine brake can work by the engagement of the second brake B2 through the oil supply from the fifth solenoid valve S5. In the R position of the manual valve 5 the second brake B2 is constantly engaged, so that the reverse transmission train is established by the engagement of the third clutch C3 through the oil supply from the third solenoid valve S3.

In the D position of the manual valve 5 there is attained a condition in which all of the solenoid valves S1–S5 can be supplied with the hydraulic oil. When the first clutch C1 is engaged by the oil supply thereto via the first solenoid valve S1, the first-speed transmission train is established. When the first clutch C1 and the first brake B1 are engaged by the oil supply thereto via the first solenoid valve S1 and the fourth solenoid valve S4, the second-speed transmission train is established. When the first clutch C1 and the third clutch C3 are engaged by the oil supply thereto via the first solenoid valve S1 and the third solenoid valve S3, the third-speed transmission train is established. When the first clutch C1 and the second clutch C2 are engaged by the oil supply thereto via the first solenoid valve S1 and the second solenoid valve S2, the fourth-speed transmission train is established. When the second clutch C2 and the third clutch C3 are engaged by the oil supply thereto via the second solenoid valve S2 and the third solenoid valve S3, the fifth-speed transmission train is established.

Each of the solenoid valves S1–S5 can be changed over between an open condition in which the upstream side and the downstream side of each solenoid valve are brought into communication with each other, and a closed condition in which the communication is shut off to thereby connect the oil passage on the downstream side thereof to an oil discharge port. In the D position the opening and closing of the first through the fourth solenoid valves S1–S4 are controlled by an electronic control circuit (not shown) depending on the running condition of the vehicle, thereby performing the automatic speed changing among the first-speed transmission train through the fifth-speed transmission train. The first and the third solenoid valves S1, S3 are constituted into a normally-open type and the second, the fourth and the fifth solenoid valves S2, S4, S5 are constituted into a normally-closed type.

The conditions of exciting of the solenoid valves S1–S5 and of engaging of the hydraulic engaging elements at the time of establishing each of the transmission trains in the D position, at the time of establishing the first-speed transmission train in the L position, and at the time of establishing the reverse running transmission train in the R position, are as shown in Table 1. In the Table, the mark "O" shows that the hydraulic engaging element is in an engaged condition and the mark "—" shows that the engaging element is in a non-engaged condition.

TABLE 1

| | | Hydraulic engaging element | | | | | Solenoid valve | | | | |
|---|---|---|---|---|---|---|---|---|---|---|---|
| | | C1 | C2 | C3 | B1 | B2 | S1 | S2 | S3 | S4 | S5 |
| D | 1st speed | O | — | — | — | — | OFF | OFF | ON | OFF | OFF |
|   | 2nd speed | O | — | — | O | — | OFF | OFF | ON | ON | OFF |
|   | 3rd speed | O | — | O | — | — | OFF | OFF | OFF | OFF | OFF |
|   | 4th speed | O | O | — | — | — | OFF | ON | ON | OFF | OFF |
|   | 5th speed | — | O | O | — | — | ON | ON | OFF | OFF | OFF |
| R | | — | — | O | — | O | OFF | OFF | OFF | OFF | OFF |
| L | | O | — | — | — | O | OFF | OFF | ON | OFF | ON |

As can be seen from Table 1, there is no occasion in which three or more of the hydraulic engaging elements are simultaneously engaged. If three or more hydraulic engaging elements are simultaneously engaged through wrong operations of the solenoid valves, a simultaneous engagement occurs.

Therefore, in the embodying example of the present invention, the following arrangement has been employed. Namely, a changeover valve 7 is interposed between the upstream oil passage L3 which is communicated with the second, the fourth and the fifth solenoid valves S2, S4, S5 and the oil passage L2 which serves as an oil supply passage to the oil passage L3 so that the simultaneous engagement of three or more hydraulic engaging elements can be prevented.

This changeover valve 7 can be changed over between an open position, on the right hand in the figure, in which the oil passage L2 and the oil passage L3 are connected together and a closed position, on the left hand in the figure, in which this connection is shut off. The changeover valve 7 is urged to the open position by inputting the line pressure from the oil passage L1 to an oil chamber 7a on the left end of the changeover valve 7. Further, there are formed in the changeover valve 7 four oil chambers 7b, 7c, 7d, 7e to urge it towards the closed position. It is thus so arranged that the changeover valve 7 is urged towards the closed position by inputting: the hydraulic oil pressure of the first clutch C1 to the oil chamber 7b via the oil passage L8; the hydraulic oil pressure of the third clutch C3 to the oil chamber 7c via the oil passage L5; the hydraulic oil pressure of the first brake B1 to the oil chamber 7d via the oil passage L6; and the hydraulic oil pressure of the second clutch C2 to the oil chamber 7e via the oil passage L4, as well as by means of a spring 7f. In a failing condition in which, among four hydraulic engaging elements consisting of the first through the third clutches C1–C3 and the first brake B1, two are engaged and in which the oil pressure in one or more of the remaining hydraulic engaging elements has risen above a predetermined pressure, with the result that three or more hydraulic engaging elements are simultaneously engaged, the combined force of the urging force of the spring 7f and the urging force by the hydraulic oil pressure to be inputted into the oil chambers 7b, 7c, 7d, 7e exceeds the urging force of the line pressure to be inputted into the oil chamber 7a, so that the changeover valve 7 is changed over to the closed position.

In a non-failing condition in which only any two of the hydraulic engaging elements are engaged, the changeover valve 7 is maintained in the open position. The oil passage L2 is connected to the oil passage L3 via an annular groove 7g in the changeover valve 7, so that the oil supply to the second solenoid valve S2 and the fourth solenoid valve S4 is continued. Thus, at the time of speed changing to the fourth-speed transmission train and the fifth-speed transmission train in which the second clutch C2 is engaged, or at the time of speed changing to the second-speed transmission train in which the first brake B1 is engaged, the oil supply to the second clutch C2 and the first brake B1 can be started from the beginning of the speed changing, resulting in a speed changing with a good response.

In the D position, it is so arranged that the oil passage L10 which is communicated with the second brake B2 is opened to atmosphere via the manual valve 5. Therefore, in this example, the hydraulic oil pressure of the second brake B2 is not inputted to the changeover valve 7. It may, however, be so arranged that the hydraulic oil pressure of the second brake B2 is inputted to the changeover valve 7 as a measure to prepare for failure in the L position.

By the way, when the changeover valve 7 is changed over to the closed position at the time of failure, the connection between the oil passage L2 and the oil passage L3 is shut off and consequently the oil passage L3 is connected to the oil discharge port 7h. As a result, even if the second solenoid valve S2 and the fourth solenoid valve S4 are in the open condition, the hydraulic oil pressure in the second clutch C2 and the first brake B1 is lowered. It follows that, in the condition as it is, the changeover valve 7 will be changed over to the open position and, thereafter, the changeover valve 7 will be changed over between the closed position and the open position, thereby giving rise to chattering.

As a solution, there is provided a hydraulic oil pressure input means for inputting the hydraulic oil pressure in the oil passage L2 to the changeover valve 7 in its closed position. It has thus been arranged that, even if the hydraulic oil pressure in the second clutch C2 or the first brake B1 may be lowered, the changeover valve 7 is held in the closed position by the hydraulic oil pressure to be inputted via the hydraulic oil pressure input means until the hydraulic oil pressure in the first clutch C1 and the third clutch C3 is lowered. In this example, the hydraulic oil pressure input means is constituted by an oil passage L11 for inputting hydraulic oil pressure which is branched from the oil passage L2 and a valve portion which is integral with the changeover valve 7 and which is interposed in the oil passage L11. In the closed position of the changeover valve 7, the oil passage L11 is brought into communication via an annular groove 7i of the changeover valve 7. To the above-described oil chamber 7d there are connected, via a shuttle valve $8_1$, the oil passage L6 which is communicated with the first brake B1, and the oil passage L11. Also to the above-described oil chamber 7e there are connected, via a shuttle valve $8_2$, the oil passage L4 which is communicated with second clutch C2, and the oil passage L11. In this manner, when the changeover valve 7 is changed over to the closed position at the time of failure, the oil passage L11 is brought into communication, and the hydraulic oil pressure of the oil passage L2 is inputted to each of the oil chambers 7d, 7e via each of the shuttle valves $8_1$, $8_2$. The changeover valve 7 can thus be maintained in the closed position even if the hydraulic oil pressure in the second clutch C2 and the first brake B1 may be lowered.

By the way, the changeover valve 7 may be provided with an oil chamber exclusively used for inputting the hydraulic oil pressure from the oil passage L11. This will, however, bring about an enlarged changeover valve 7, resulting in a poor response at the time of failure. On the other hand, according to this example, the oil chambers 7d, 7e to which the hydraulic oil pressure from the first brake B1 and the second clutch C2 is inputted can be used also as the oil chamber to input thereto the hydraulic oil pressure from the oil passage L11. It is therefore advantageous in that the changeover valve 7 does not become large in size.

Figure 3:
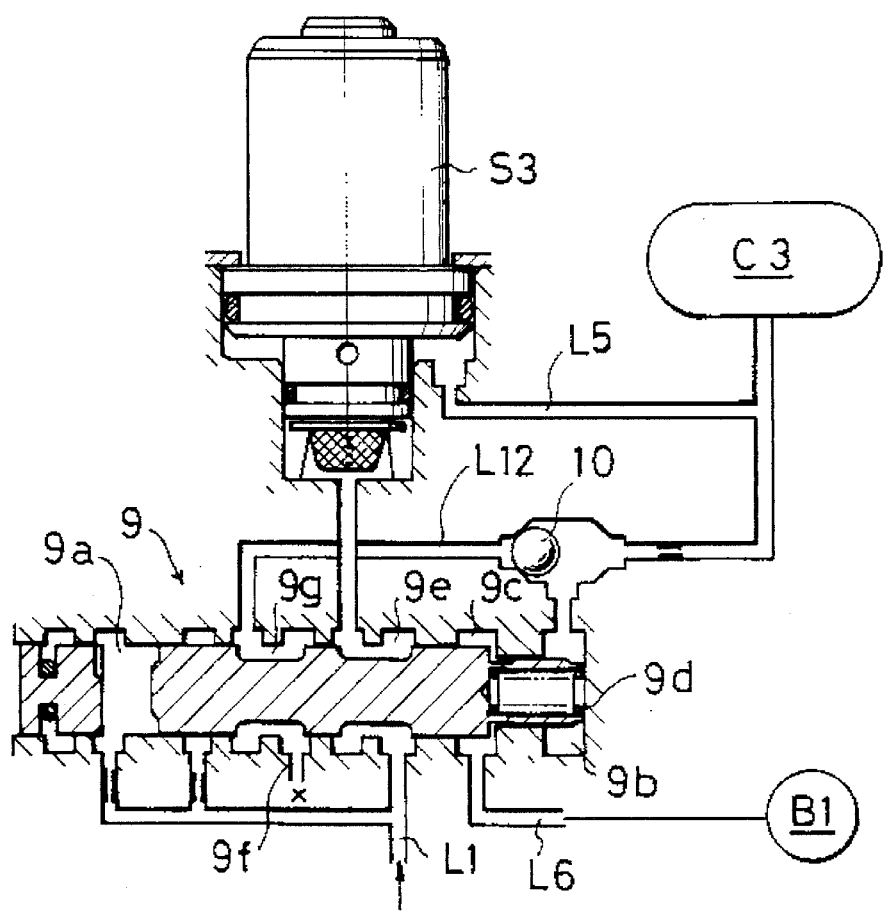
FIG. 3 is a hydraulic circuit diagram of another example of the apparatus of the present invention.

In the above-described transmission, even in a condition in which, in the D position, two of the hydraulic engaging elements among the first through the third clutches C1, C2, C3 and the first brake B1 are engaged, the rotation of the input shaft 1a of the transmission is restricted if the engaged ones are the third clutch C3 and the first brake B1. In order to prevent the simultaneous engagement of the third clutch C3 and the first brake B1, there is interposed another changeover valve, aside from the above-described one, on the upstream side of the solenoid valve which controls the hydraulic oil supply to, and discharge from, one of the third clutch C3 and the first brake B1. FIG. 3 shows an example in which a changeover valve 9 is interposed between the third solenoid valve S3 and the oil passage L1 on the upstream side thereof.

This changeover valve 9 is urged towards the right-hand open position by that hydraulic oil pressure of the oil passage L1 which is inputted to the left-hand oil chamber 9a. It is further urged towards the left-hand closed position by that hydraulic oil pressure of the third clutch C3 and the first brake B1 which is inputted to two oil chambers 9b, 9c on the right end as well as by a spring 9d inside the oil chamber 9b. When, at the time of engagement of one of the third clutch C3 and the first brake B1, the hydraulic oil pressure in the other of the third clutch C3 and the first brake B1 has risen above such a predetermined pressure as will cause a substantial engagement thereof, the changeover valve 9 is changed over to the closed position. In the open position of the changeover valve 9 the oil passage L1 is connected to the third solenoid valve S3 via an annular groove 9e of the changeover valve 9. In the closed position, on the other hand, the connection is shut off, so that the solenoid valve S3 is connected to an oil discharge port 9f of the changeover valve 9. Thus, the hydraulic oil pressure in the third clutch C3 is lowered and, consequently, the simultaneous engagement of the third clutch C3 and the first brake B1 can be blocked.

To the above-described oil chamber 9b there are connected, via a shuttle valve 10, the oil passage L5 which is communicated with the third clutch C3 and an oil passage L12 for inputting the hydraulic oil pressure. In the closed position of the changeover valve 9 the oil passage L12 is connected to the oil passage L1 via an annular groove 9g of the changeover valve 9. The hydraulic oil pressure of the oil passage L1 is thus inputted to the oil chamber 9b, so that, even if the hydraulic oil pressure in the third clutch C3 may be lowered, the changeover valve 9 is maintained in the closed position until the hydraulic oil pressure in the first brake B1 is lowered.

An explanation has so far been made about the example in which the present invention is applied to the control apparatus of the planetary gear type of transmission of five forward speeds. This invention can also be applied to the control apparatus of a transmission of a parallel-2-shaft type of transmission. In the parallel-2-shaft type of transmission, each of the transmission trains is arranged to be established by the engagement of one hydraulic engaging element corresponding to each transmission train. It means that there shall not be simultaneously engaged two or more hydraulic engaging elements other than that for the first-speed transmission train for interposing therein a one-way clutch. Therefore, the following arrangement may be employed. Namely, the hydraulic oil is supplied to each of the solenoid valves for each of the hydraulic engaging elements other than that for the first-speed transmission train, via a common changeover valve. This changeover valve is thereby urged to the closed position by the hydraulic oil pressure of all the hydraulic engaging elements other than that of the first-speed transmission train. The changeover valve is then changed over to the closed position when the hydraulic oil pressure of one or more of the remaining hydraulic engaging elements has risen in a condition in which any one of these hydraulic engaging elements is engaged.

In the above-described examples, the changeover valves 7, 9 are arranged to be urged to the open position by the hydraulic oil pressure (line pressure). However, it may be arranged to urge the changeover valve to the open position by means of a spring.

As can be seen from the above explanations, according to the present invention, by providing the changeover valve on the upstream side of the solenoid valve, the length of the oil passage between the solenoid valve and the hydraulic engaging element on the down stream side of the solenoid valve can be shortened. Also, at the time of non-failure, the changeover valve is held in the open position, so that the hydraulic oil supply to the hydraulic engaging elements can be started from the beginning of speed changing, resulting in an improvement in the response. Further, at the time of failure, the changeover valve can be held in the closed position without giving rise to chattering, thereby surely preventing the occurrence of simultaneous engagement.

It is readily apparent that the above-described control apparatus for hydraulically operated transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for a hydraulically operated transmission having a plurality of hydraulic engaging elements, comprising:

a solenoid valve for controlling hydraulic oil supply to, and discharge from, a predetermined hydraulic engaging element;

a changeover valve which is interposed between said solenoid valve and an oil supply passage on an upstream side of said solenoid valve and which can be changed over between an open position for establishing a connection between said oil passage and said solenoid valve and a closed position for shutting off the connection;

wherein, at the time of engagement of another hydraulic engaging element which should not be engaged simultaneously with said predetermined hydraulic engaging element, engagement of said predetermined hydraulic engaging element is blocked by changing over of said changeover valve to said closed position;

wherein said changeover valve is inputted, as a hydraulic oil pressure to urge it towards said closed position, by a hydraulic oil pressure of said predetermined hydraulic engaging element and a hydraulic oil pressure of said another hydraulic engaging element such that, when the hydraulic oil pressure of one of said both hydraulic engaging elements has risen at the time of engagement of the other of said both hydraulic engaging elements, said changeover valve can be changed over to said closed position; and hydraulic oil pressure input means for inputting, as a hydraulic oil pressure to urge said changeover valve to said closed position, a working hydraulic oil pressure of predetermined pressure in interlocking with changing over of said changeover valve to said closed position, said working hydraulic oil pressure being free from an influence of said solenoid valve.

2. An apparatus for controlling a hydraulically operated transmission having a plurality of three or more hydraulic engaging elements, said transmission having a plurality of transmission trains to be established by a simultaneous engagement of respective two of said hydraulic engaging elements, said apparatus comprising:

a solenoid valve for controlling hydraulic oil supply to, and discharge from, a predetermined hydraulic engaging element;

a changeover valve which is interposed between said solenoid valve and an oil supply passage on an upstream side of said solenoid valve and which can be changed over between an open position for establishing a connection between said oil passage and said solenoid valve and a closed position for shutting off the connection;

wherein said changeover valve is inputted, as a hydraulic oil pressure to urge it towards said closed position, by a hydraulic oil pressure of a plurality of hydraulic engaging elements inclusive of said predetermined hydraulic engaging element such that when, at the time of engagement of any two of said hydraulic engaging elements, the hydraulic oil pressure of one or more of the remaining hydraulic engaging elements has risen, said changeover valve is changed over to said closed position; and hydraulic oil pressure input means for inputting, as a hydraulic oil pressure to urge said changeover valve to said closed position, a working hydraulic oil pressure f a predetermined pressure in interlocking with changing over of said changeover valve to said closed position, said working hydraulic oil pressure being free from an influence of said solenoid valve.

3. An apparatus for controlling a hydraulically operated transmission according to claim 1 or 2, wherein said hydraulic oil pressure input means comprises:

an input oil passage of the working hydraulic oil pressure which is communicated with an oil chamber provided in said changeover valve to input therein the working hydraulic oil pressure; and a valve portion which is integral with said changeover valve and which is interposed in said input oil passage so as to open said input oil passage at said closed position of said changeover valve.

4. An apparatus for controlling a hydraulically operated transmission according to claim 3, wherein an oil passage which is in communication with said predetermined hydraulic engaging element and said input oil passage are connected, via a shuttle valve, to an oil chamber which is provided in said changeover valve to input therein the hydraulic oil pressure of said predetermined hydraulic engaging element, whereby said oil chamber is used also as an input oil chamber for the working oil pressure.

5. An apparatus for controlling a hydraulically operated transmission according to claim 1 or 2, wherein said working oil pressure is a hydraulic oil pressure of said oil supply passable.

* * * * *